(12) United States Patent
Gente et al.

(10) Patent No.: US 12,347,895 B2
(45) Date of Patent: Jul. 1, 2025

(54) FUEL CELL STACK

(71) Applicant: Robert Bosch GmbH, Stuttgart (DE)

(72) Inventors: Arnold Gente, Stuttgart (DE);
Eberhard Maier, Koengen (DE)

(73) Assignee: Robert Bosch GmbH, Stuttgart (DE)

( * ) Notice: Subject to any disclaimer, the term of this patent is extended or adjusted under 35 U.S.C. 154(b) by 528 days.

(21) Appl. No.: 17/789,868

(22) PCT Filed: Nov. 30, 2020

(86) PCT No.: PCT/EP2020/083932
§ 371 (c)(1),
(2) Date: Jun. 29, 2022

(87) PCT Pub. No.: WO2021/136623
PCT Pub. Date: Jul. 8, 2021

(65) Prior Publication Data
US 2023/0056961 A1 Feb. 23, 2023

(30) Foreign Application Priority Data
Dec. 30, 2019 (DE) ..................... 10 2019 220 603.4

(51) Int. Cl.
*H01M 8/0258* (2016.01)
*H01M 8/0267* (2016.01)
(Continued)

(52) U.S. Cl.
CPC ....... *H01M 8/0258* (2013.01); *H01M 8/0267* (2013.01); *H01M 8/0276* (2013.01); *H01M 8/1004* (2013.01)

(58) Field of Classification Search
CPC ............. H01M 8/0258; H01M 8/0267; H01M 8/0276; H01M 8/1004; H01M 8/0271; Y02E 60/50
See application file for complete search history.

(56) References Cited

U.S. PATENT DOCUMENTS 6,231,053 B1   5/2001   Wakamatsu

FOREIGN PATENT DOCUMENTS

DE   102016202481 A1   8/2017
DE   102016205043 A1   9/2017
(Continued)

OTHER PUBLICATIONS

Translation of International Search Report for Application No. PCT/EP2020/083932 dated Feb. 22, 2021 (2 pages).

*Primary Examiner* — Daniel S Gatewood
(74) *Attorney, Agent, or Firm* — Michael Best & Friedrich LLP

(57) ABSTRACT

The invention relates to a fuel cell stack (100) having at least one fuel cell (101) which has a membrane (CCM) for separating an anode side (A) of the fuel cell (101) from a cathode side (K) of the fuel cell (101), an anode-side gas diffusion layer (GDLA), a cathode-side gas diffusion layer (GDLK) and a bipolar plate (BPP) for separating the fuel cell (101) from an adjacent fuel cell (101) or a housing. According to the invention, the membrane (CCM) protrudes beyond the anode-side gas diffusion layer (GDLA) and the cathode-side gas diffusion layer (GDLK) in an edge region (R) located outside an active area (AF) of the membrane (CCM), and the membrane (CCM) has a centering dam (10) in the edge region (R) of the anode side (A) or of the cathode side (K).

18 Claims, 2 Drawing Sheets

(51) Int. Cl.
*H01M 8/0276* (2016.01)
*H01M 8/1004* (2016.01)

(56) References Cited

FOREIGN PATENT DOCUMENTS

| | | | |
|---|---|---|---|
| DE | 102017101954 A1 * | 8/2018 | |
| JP | 2008078050 A | 4/2008 | |
| WO | 2019175200 A1 | 9/2019 | |

* cited by examiner

FUEL CELL STACK

BACKGROUND OF THE INVENTION

The invention relates to a fuel cell stack and also to a corresponding method for producing a fuel cell stack.

Fuel cell stacks are known in principle. With current fuel cell stacks it is oftentimes difficult to center the membrane in such a way that the active area of the membrane is aligned sufficiently with respect to the bipolar plate. If the membrane is not aligned flush to the edge regions of the bipolar plate, in the edge regions of the membrane and in the port regions of the fuel cell stack, there may be problems. Gapping of the membrane and/or of the sealing layer of the membrane in these edge regions leads potentially to a short-circuit between the various electrical potentials of the successive bipolar plates. This problem is exasperated by mechanical damage due to an insufficiently rigid construction of the fuel cell stack. This problem can usually be prevented, however, if the membrane or the sealing layer of the membrane protrudes sufficiently beyond the edge regions of the bipolar plate. This protrusion is not always desirable, however, in the port regions of the fuel cell, owing to constriction of the media flows, or else at the regions of the fuel cell stack which are supposed to be used for aligning the membranes and the bipolar plates when the fuel cell stack is assembled.

SUMMARY OF THE INVENTION

In a first aspect the invention provides a fuel cell stack having the features of the independent apparatus claim, more particularly from the characterizing part. Further, in a second aspect, the invention provides a method for producing a fuel cell stack. Further advantages, features, and details of the invention are apparent from the dependent claims, the description, and the drawings. Features and details here which are described in connection with the fuel cell stack of the invention are of course also valid in connection with the method of the invention, and vice versa, and so there always is or may be mutual reference with regard to the disclosure relating to the individual aspects of the invention.

In the first aspect the present invention provides a fuel cell stack comprising at least one fuel cell, which comprises a membrane for separating an anode side of the fuel cell from a cathode side of the fuel cell, an anode-side gas diffusion layer, a cathode-side gas diffusion layer, and a bipolar plate for separating the fuel cell from an adjacent fuel cell or from a housing. In this regard it is provided in accordance with the invention that the membrane protrudes beyond the anode-side gas diffusion layer and the cathode-side gas diffusion layer (at least in a direction perpendicular to channels of the bipolar plate) in an edge region which is located outside an active area of the membrane, and that the membrane comprises a centering dam in the edge region of the anode side or of the cathode side.

The fuel cell stack for the purposes of the invention may comprise one or more fuel cells, which may be stacked on one another in layers and may be braced between two end plates.

The concept of the invention here is that the centering dam provides an optimized edge region of the membrane that enables improved centering of the membrane and of the bipolar plate within the fuel cell stack, that affords improved securement against leakage currents, and that ensures improved sealing of the fuel cell. With the centering dam a relatively stiff region is integrated at the edge region of the membrane. The centering dam serves advantageously for alignment of the bipolar plate and for the centering aid for the membrane in relation to the bipolar plate. By means of the protruding region of the membrane beyond the anode-side gas diffusion layer and/or the cathode-side gas diffusion layer, electrical short-circuiting between the successive bipolar plates of adjacent fuel cells, and also mechanical damage to the successive bipolar plates, can be prevented. The edge region of the membrane, furthermore, makes the fuel cell robust in this region with respect to mechanical stressing. This may contribute considerable advantages in the case of the stacking of the fuel cells to form a fuel cell stack. The edge region of the membrane may, according to what is desired, be implemented flush to the edge regions of the bipolar plates, or may protrude beyond them. Leakage currents can be reduced accordingly. A misalignment of the membrane at the edge region is visible immediately by means of the projecting centering dam. Errors in the centering of the membrane are reliably avoided in this way. Moreover, the centering dam helps to increase the structural rigidity of the membrane on assembly of the fuel cell stack.

In a fuel cell stack, furthermore, the invention may provide that the centering dam is secured cohesively on the membrane. Accordingly it is possible to facilitate the handling of the membrane with the centering dam secured thereon when the fuel cell stack is assembled. Moreover, the cohesive connection is able to provide a sealing connection between the membrane and the centering dam.

In the case of a fuel cell stack, furthermore, the invention is able to provide that the centering dam is printed, vulcanized or injection-molded on the membrane. In this way, flexible securement of the centering dam on the membrane can be enabled. Virtually all plastics can be processed by injection molding. Through vulcanization it is possible to convert thermoplastic polymers, such as natural rubbers or synthetic rubbers, for example, into elastomeric polymers (rubbers). By means of printing processes it is possible to produce flexible geometries.

In the case of a fuel cell stack, furthermore, the invention may provide that in the edge region the membrane is provided with an elastic sealing layer (referred to as a subgasket), with the centering dam secured cohesively on the sealing layer. The centering dam may therefore serve as an extended seal.

In the case of a fuel cell stack, moreover, the invention may provide that the centering dam is printed, vulcanized or injection-molded on the sealing layer. The advantages of these processes have already been described above. These advantages are adopted here.

It is conceivable, moreover, for the centering dam to be produced by folding of a sealing layer. The sealing layer may be provided in the form of a thin, flat, elastic layer, made of a thermoplastic material, for example. By folding such a layer it is possible to provide rigid elements having sealing qualities. A centering dam of this kind may be advantageous, furthermore, because no additional materials and/or tools are required in order to produce the centering dam.

In the case of a fuel cell stack, further, the invention may provide that the centering dam has a height which is less than the height of a coolant channel of the bipolar plate (or the height of the bipolar plate). In this way, production tolerances on provision of the membranes, the gas diffusion layers and/or the bipolar plates can be bridged, and this may be a considerable advantage during stacking of the membrane and of the bipolar plate.

In the case of a fuel cell stack, additionally, the invention may provide that the centering dam has a height which is 0.5 to 0.99, more particularly 0.7 to 0.9, times the height of a coolant channel of the bipolar plate. In this way it is possible to compensate production tolerances during provision of the membranes, the gas diffusion layers and/or the bipolar plates in an improved way.

In the case of a fuel cell stack, furthermore, the invention may provide that the bipolar plate comprises a closed coolant channel in the edge region of the membrane. The closed coolant channel may serve advantageously for lying against the centering dam in order to center the membrane in the fuel cell stack and in order to seal the at least one fuel cell.

The closed coolant channel may be produced advantageously by bending of two plates of the bipolar plate in the same direction. In this way a bent edge can be provided on the bipolar plate, which may come to rest sealingly on the centering dam.

According to a further advantage, the closed coolant channel may be aligned at an angle between 0° and 90°, more particularly between 30° and 60°, preferably 45°, to the membrane. In this way the sealing rest on the centering dam can be facilitated in a simple way.

In the case of a fuel cell stack, moreover, the invention may provide that the centering dam is matched to the geometry of the bipolar plate in the edge region of the membrane, in order to center the membrane in the fuel cell stack, and in order to seal the at least one fuel cell. Hence it is possible to facilitate the possibility of centering the membrane in the edge region by the lying of the centering dam against the inclined face (or on the closed coolant channel) of the bipolar plate. It is also possible thereby to ensure that a closed and sealed region can be produced between the membrane and the bipolar plate on the edge region of the membrane.

In the case of a fuel cell stack, moreover, the invention may provide that the centering dam is configured in the form of a trapezium. In this case advantageously the base of the trapezium may lie on the membrane or on a sealing layer of the membrane. In this way it is possible to facilitate a stable rest of the centering dam on the membrane and, moreover, an improved rest of the centering dam on the inclined face (or on the closed coolant channel) of the bipolar plate.

In the case of a fuel cell stack, furthermore, the invention may provide that the trapezium comprises a leg which is aligned parallel to the closed coolant channel of the bipolar plate and lies sealingly against the closed coolant channel of the bipolar plate. Accordingly the sealing of the fuel cell and the centering of the membrane relative to the bipolar plate can be ensured in an improved way.

In a second aspect, moreover, the invention may provide a method for producing a fuel cell stack, whereby at least one fuel cell is provided which comprises a membrane for separating an anode side of the fuel cell from a cathode side of the fuel cell, an anode-side gas diffusion layer, a cathode-side gas diffusion layer, and a bipolar plate for separating the fuel cell from an adjacent fuel cell or from a housing. For this purpose it is provided in accordance with the invention that the membrane is positioned in such a way that the edge region of the membrane, which is located outside an active area of the membrane, protrudes beyond the anode-side gas diffusion layer and/or the cathode-side gas diffusion layer (at least in a direction perpendicular to channels of the bipolar plate), and that the membrane is configured with a centering dam in the edge region of the anode side or of the cathode side. By means of the method of the invention, the same advantages are achieved as have been described above in connection with the fuel cell stack of the invention. These advantages are presently referenced in their entirety.

BRIEF DESCRIPTION OF THE DRAWINGS

The invention and developments thereof and also the advantages thereof are elucidated in more detail below by means of drawings. In the drawings, schematically in each case.

DETAILED DESCRIPTION

Figure 1:
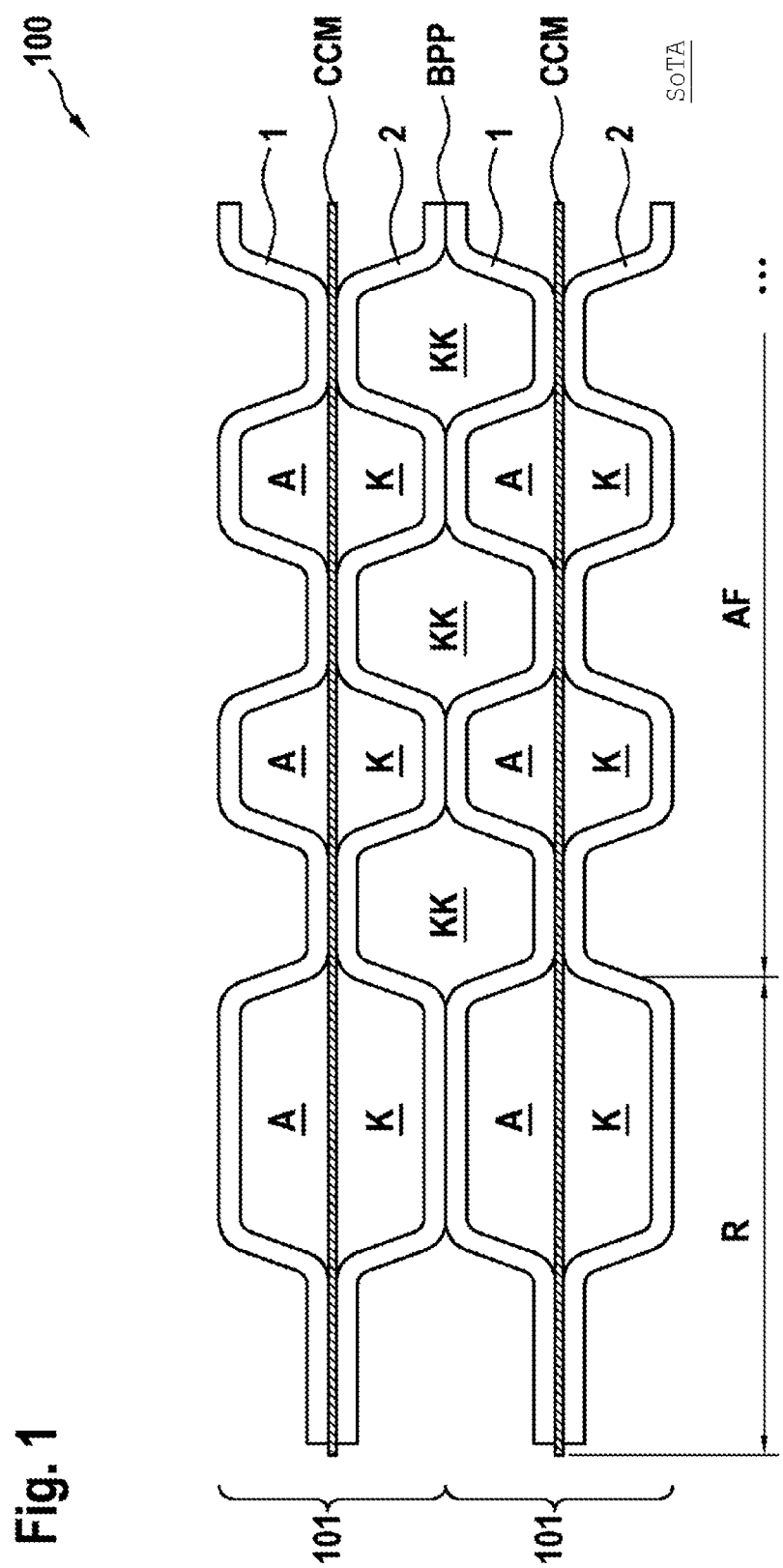
FIG. 1 shows a schematic representation of a known fuel cell stack.

FIG. 1 serves for elucidating the problem which underlies the invention. FIG. 1 shows a known fuel cell stack 100; when a fuel cell stack 100 of this kind is assembled, it may be the case that a membrane CCM is not precisely aligned in relation to a bipolar plate BPP. If the membrane CCM is not aligned flush to the edge regions of the bipolar plate BPP in the edge regions R of the membrane CCM and in the port regions of the fuel cell stack 100, there may be problems. Gapping of the membrane CCM in relation to the bipolar plates BPP in these edge regions R may lead to a short-circuit between successive bipolar plates BPP. Moreover, gapping of the membrane CCM in relation to the bipolar plates BPP in the edge regions R may result in mechanical damage to the membrane CCM and/or to the bipolar plates BPP and/or in instability of the fuel cell stack 100. If, however, the membrane CCM protrudes sufficiently beyond the edge regions of the bipolar plate BPP, this problem can usually be overcome. However, this projection of the membrane CCM beyond the edge regions of the bipolar plate BPP in the port regions of the fuel cell 101 or else at the regions of the fuel cell stack 100 which are supposed to be used for aligning the membranes CCM and the bipolar plates BPP when the fuel cell stack 100 is assembled may be disadvantageous.

Figure 2:
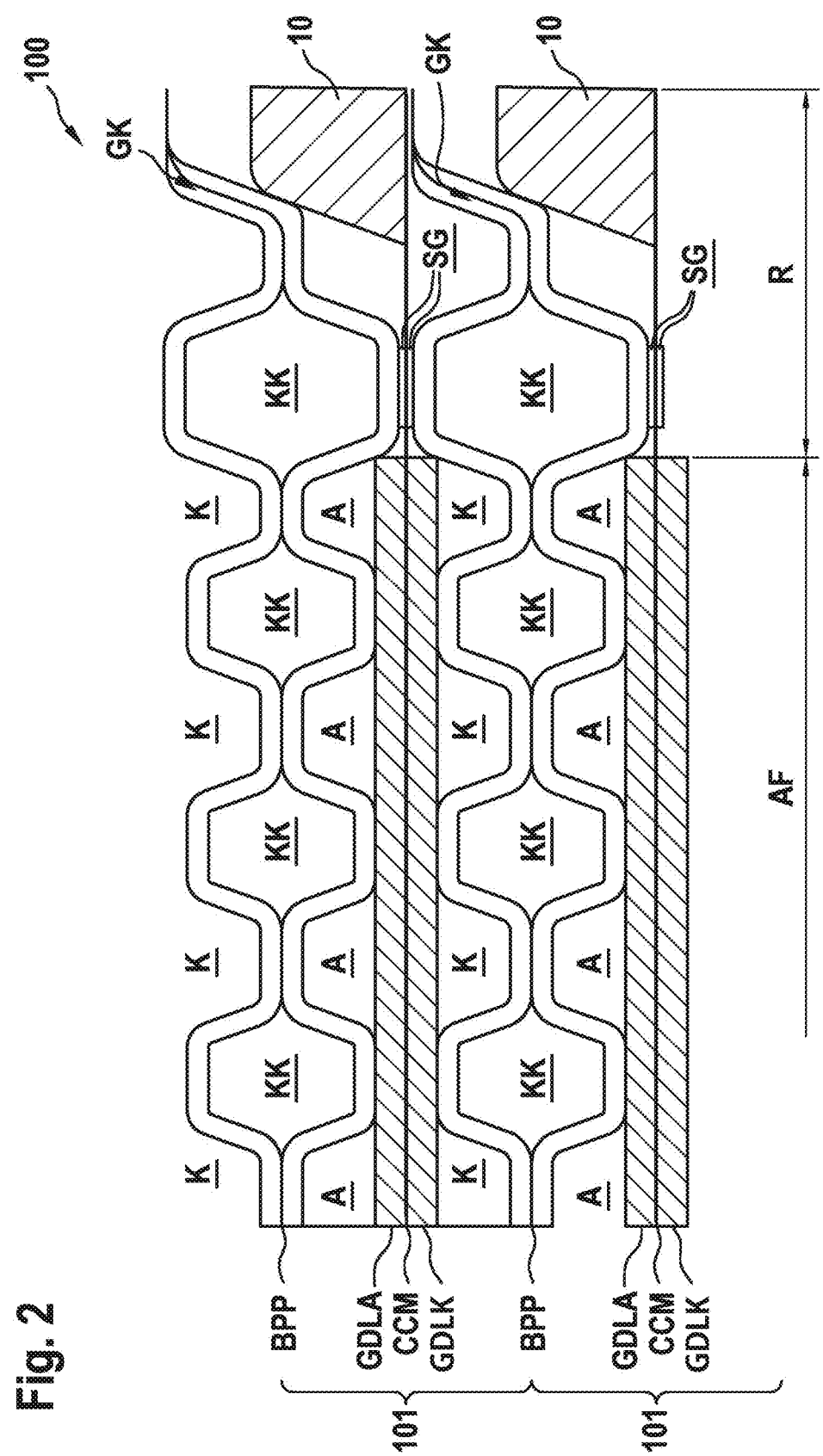
FIG. 2 shows a schematic representation of a fuel cell stack of the invention.

FIG. 2 shows a fuel cell stack 100 of the invention, comprising at least one fuel cell 101 or a plurality of fuel cells 101, with the or each fuel cell 101 comprising a membrane CCM, which separates an anode side A from a cathode side K of the fuel cell 101, an anode-side gas diffusion layer GDLA, a cathode-side gas diffusion layer GDLK, and a bipolar plate BPP, which separates the fuel cell 101 from an adjacent fuel cell 101 or from a housing (not shown).

The invention here provides that the membrane CCM, in an edge region R which is located outside an active area AF of the membrane CCM, protrudes beyond the anode-side gas diffusion layer GDLA and the cathode-side gas diffusion layer GDLK (at least in a direction perpendicular to channels of the bipolar plate BPP), and that the membrane CCM comprises a centering dam 10 in the edge region R of the anode side A or of the cathode side K.

In this case there is a closed coolant channel GK of the bipolar plate BPP of an adjacent fuel cell 101 lying against the membrane CCM from the cathode side K.

In FIG. 2 the centering dam 10 is shown merely illustratively from the anode side A of the fuel cell 101; a configuration of the centering dam 10 from the cathode side K of the fuel cell 101 would be likewise possible. In the latter case, the bipolar plate BPP of an adjacent fuel cell 101 may be bent in a different direction in the edge region R of the membrane CCM, and may lie against the membrane CCM of the adjacent fuel cell 101 from the anode side A of the fuel cell 101.

The membrane CCM may comprise two edge regions R left and right of the active area AF. These edge regions R may be aligned parallel or substantially parallel to the coolant channels KK in the bipolar plates BPP.

The centering dam 10, accordingly, may be aligned parallel or substantially parallel to the coolant channels KK in the bipolar plates BPP. It is conceivable here for the centering dam 10 to be configured in the form of a bead.

The centering dam 10 provides an optimized edge region R of the membrane, which enables improved centering of the membrane CCM and of the bipolar plate BPP within the fuel cell stack 100, which affords improved securement against leakage currents and which ensures improved sealing of the fuel cell stack 100 (at least in a direction perpendicular to the channels of the bipolar plate BPP).

The centering dam 10 creates a more rigid region at the edge region R of the membrane CCM. The centering dam 10 is therefore able to serve for aligning the bipolar plate BPP and for centering the membrane CCM with respect to the bipolar plate BPP. As a result of the protruding region of the membrane CCM beyond the anode-side gas diffusion layer GDLA and the cathode-side gas diffusion layer GDLK, it is possible to prevent electrical short-circuiting between the successive bipolar plates BPP of adjacent fuel cells 101 and also mechanical damage to the successive bipolar plates BPP. If desired, the edge region R of the membrane CCM may be implemented flush to the edge regions of the bipolar plates BPP or may protrude beyond them.

The centering dam 10 may be secured cohesively, such as by injection molding, vulcanizing or printing, on the membrane CCM or on a sealing layer SG, a so-called subgasket, of the membrane CCM.

If the sealing layer SG is desired in the entire edge region R of the membrane CCM, the centering dam 10 may be produced by folding of the sealing layer SG. The sealing layer SG is usually a thin, flat, elastic layer, which can be folded together or rolled up to form a rigid centering dam 10 having sealing qualities.

As can be seen from FIG. 2, the centering dam 10 may have a height which is less than the height of a coolant channel KK of the bipolar plate BPP or in other words less than the height of the bipolar plate BPP. In this way it is possible to compensate production tolerances which may arise on production of the membranes CCM, the gas diffusion layers GDLA, GDLK and/or the bipolar plates BPP.

As is additionally indicated in FIG. 2, the centering dam 10 may have a height which is 0.5 to 0.99, more particularly 0.7 to 0.9, times the height of a coolant channel KK of the bipolar plate BPP.

As already mentioned above, the bipolar plate BPP in the sense of the invention may comprise a closed coolant channel GK in the edge region R of the membrane CCM. The closed coolant channel GK serves for improved resting on the centering dam 10.

As can be seen in FIG. 2, the closed coolant channel GK may be formed by bending of two plates 1, 2 of the bipolar plate BPP in the same direction. The bend is made at an angle between 0° and 90°, more particularly between 30° and 60°, preferably 45°, to the membrane CCM.

In the edge region R of the membrane CCM, the centering dam 10 may advantageously be matched to the geometry of the bipolar plate BPP, more particularly of the closed coolant channel GK of the bipolar plate BPP, in order to center the membrane CCM in the fuel cell stack 100, and in order to seal the at least one fuel cell 101. In that case the membrane CCM may be centered in the edge region R by the centering dam 10 lying against the inclined face of the closed coolant channel GK of the bipolar plate BPP. Moreover, a closed and sealed region between the membrane CCM and the bipolar plate BPP may be produced by the centering dam 10 at the edge region R of the membrane CCM.

For the purposes of the invention, the centering dam 10 may have a trapezoidal and/or bead-form configuration. In that case advantageously the base of the trapezium may lie on the membrane CCM or on the sealing layer SG of the membrane CCM. The leg of the trapezium that lies against the inclined face of the closed coolant channel GK of the bipolar plate BPP here may be aligned parallel to the closed coolant channel GK of the bipolar plate BPP.

The above description of the figures describes the present invention exclusively in the ambit of examples. Insofar as is technically rational, individual features of the embodiments may of course be freely combined with one another without departing the ambit of the invention.

The invention claimed is:

1. A fuel cell stack (100), comprising:
   at least one fuel cell (101), which comprises
   a membrane (CCM) for separating an anode side (A) of the fuel cell (101) from a cathode side (K) of the fuel cell (101),
   an anode-side gas diffusion layer (GDLA),
   a cathode-side gas diffusion layer (GDLK), and
   a bipolar plate (BPP) for separating the fuel cell (101) from an adjacent fuel cell (101) or from a housing,
   wherein the membrane (CCM) protrudes beyond the anode-side gas diffusion layer (GDLA) and the cathode-side gas diffusion layer (GDLK) in an edge region (R) which is located outside an active area (AF) of the membrane (CCM),
   wherein the membrane (CCM) comprises a centering dam (10) in the edge region (R) of the anode side (A) or of the cathode side (K), and
   wherein the bipolar plate (BPP) comprises a closed coolant channel (GK) in the edge region (R) of the membrane (CCM).

2. The fuel cell stack (100) as claimed in claim 1,
   wherein the centering dam (10) is secured cohesively on the membrane (CCM), and/or
   wherein the centering dam (10) is printed, vulcanized or injection-molded on the membrane (CCM).

3. The fuel cell stack (100) as claimed in claim 1,
   wherein in the edge region (R) the membrane (CCM) is provided with an elastic sealing layer (SG).

4. The fuel cell stack (100) as claimed in claim 3,
   wherein the centering dam (10) is printed, vulcanized or injection-molded on the sealing layer (SG), or
   wherein the centering dam (10) is produced by folding of a sealing layer (SG).

5. The fuel cell stack (100) as claimed in claim 1,
   wherein the centering dam (10) has a height which is less than a height of a coolant channel (KK) of the bipolar plate (BPP), and/or
   wherein the centering dam (10) has a height which is 0.5 to 0.99 times the height of a coolant channel (KK) of the bipolar plate (BPP).

6. The fuel cell stack (100) as claimed in claim 1,
   wherein the closed coolant channel (GK) is produced by bending of two plates (1, 2) of the bipolar plate (BPP) in the same direction, and/or
   wherein the closed coolant channel (GK) is aligned at an angle between 0° and 90° to the membrane (CCM).

7. The fuel cell stack (100) as claimed in claim 1,
   wherein the centering dam (10) abuts the bipolar plate (BPP) in the edge region (R) of the membrane (CCM)

in order to center the membrane (CCM) in the fuel cell stack (100) and in order to seal the at least one fuel cell (101).

8. The fuel cell stack (100) as claimed in claim 1,
wherein the centering dam (10) is configured in the form of a trapezium.

9. The fuel cell stack (100) as claimed in claim 8,
wherein the trapezium has a leg which is aligned parallel to the closed coolant channel (GK) of the bipolar plate (BPP) and lies sealingly against the closed coolant channel (GK) of the bipolar plate (BPP).

10. The fuel cell stack (100) as claimed in claim 2,
wherein in the edge region (R), the membrane (CCM) is provided with an elastic sealing layer (SG).

11. The fuel cell stack (100) as claimed in claim 10,
wherein the centering dam (10) is printed, vulcanized or injection-molded on the sealing layer (SG), or
wherein the centering dam (10) is produced by folding of a sealing layer (SG).

12. The fuel cell stack (100) as claimed in claim 11,
wherein the centering dam (10) has a height which is less than a height of a coolant channel (KK) of the bipolar plate (BPP), and/or
wherein the centering dam (10) has a height which is 0.7 to 0.9 times the height of a coolant channel (KK) of the bipolar plate (BPP).

13. The fuel cell stack (100) as claimed in claim 12,
wherein the closed coolant channel (GK) is produced by bending of two plates (1, 2) of the bipolar plate (BPP) in the same direction, and/or
wherein the closed coolant channel (GK) is aligned at an angle between 30° and 60° to the membrane (CCM).

14. The fuel cell stack (100) as claimed in claim 12,
wherein the closed coolant channel (GK) is produced by bending of two plates (1, 2) of the bipolar plate (BPP) in the same direction, and/or
wherein the closed coolant channel (GK) is aligned at an angle of 45° to the membrane (CCM).

15. The fuel cell stack (100) as claimed in claim 14,
wherein the centering dam (10) abuts the bipolar plate (BPP) in the edge region (R) of the membrane (CCM) in order to center the membrane (CCM) in the fuel cell stack (100) and in order to seal the at least one fuel cell (101).

16. The fuel cell stack (100) as claimed in claim 15,
wherein the centering dam (10) is configured in the form of a trapezium,
with the base of the trapezium lying on the membrane (CCM) or on a sealing layer (SG) of the membrane (CCM).

17. The fuel cell stack (100) as claimed in claim 16,
wherein the trapezium has a leg which is aligned parallel to the closed coolant channel (GK) of the bipolar plate (BPP) and lies sealingly against the closed coolant channel (GK) of the bipolar plate (BPP).

18. A fuel cell stack (100), comprising:
at least one fuel cell (101), which comprises
a membrane (CCM) for separating an anode side (A) of the fuel cell (101) from a cathode side (K) of the fuel cell (101),
an anode-side gas diffusion layer (GDLA),
a cathode-side gas diffusion layer (GDLK), and
a bipolar plate (BPP) for separating the fuel cell (101) from an adjacent fuel cell (101) or from a housing,
wherein the membrane (CCM) protrudes beyond the anode-side gas diffusion layer (GDLA) and the cathode-side gas diffusion layer (GDLK) in an edge region (R) which is located outside an active area (AF) of the membrane (CCM),
wherein the membrane (CCM) comprises a centering dam (10) in the edge region (R) of the anode side (A) or of the cathode side (K),
wherein the centering dam (10) has a height which is less than a height of a coolant channel (KK) of the bipolar plate (BPP), and/or
wherein the centering dam (10) has a height which is 0.5 to 0.99 times the height of a coolant channel (KK) of the bipolar plate (BPP).

\* \* \* \* \*